US006961808B1

(12) United States Patent
Oren et al.

(10) Patent No.: US 6,961,808 B1
(45) Date of Patent: Nov. 1, 2005

(54) METHOD AND APPARATUS FOR IMPLEMENTING AND USING MULTIPLE VIRTUAL PORTIONS OF PHYSICAL ASSOCIATIVE MEMORIES

(75) Inventors: Eyal Oren, Raanana (IL); David E. Belz, Raanana (IL)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 10/042,836

(22) Filed: Jan. 8, 2002

(51) Int. Cl.[7] ............................................. G06F 12/00
(52) U.S. Cl. ........................................ 711/108; 365/49
(58) Field of Search .................... 365/49, 50; 370/374, 370/392, 395.7, 409; 711/108

(56) References Cited

U.S. PATENT DOCUMENTS

| | | |
|---|---|---|
| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,088,032 A | 2/1992 | Bosack |
| 5,319,763 A | 6/1994 | Ho et al. |
| 5,383,146 A | 1/1995 | Threewitt |
| 5,440,715 A | 8/1995 | Wyland |
| 5,450,351 A | 9/1995 | Heddes |
| 5,481,540 A | 1/1996 | Huang |
| 5,515,370 A | 5/1996 | Rau |
| 5,701,300 A * | 12/1997 | Jeon et al. ................... 370/392 |
| 5,740,171 A | 4/1998 | Mazzola et al. |
| 5,841,874 A | 11/1998 | Kempke et al. |
| 5,842,040 A | 11/1998 | Hughes et al. |
| 5,898,689 A | 4/1999 | Kumar et al. |
| 5,920,886 A | 7/1999 | Feldmeier |
| 5,930,359 A | 7/1999 | Kempke et al. |
| 5,956,336 A | 9/1999 | Loschke et al. |
| 5,978,885 A | 11/1999 | Clark, II |
| 6,000,008 A | 12/1999 | Simcoe |
| 6,011,795 A * | 1/2000 | Varghese et al. ............. 370/392 |
| 6,018,524 A * | 1/2000 | Turner et al. ................ 370/392 |
| 6,041,389 A | 3/2000 | Rao |
| 6,047,369 A | 4/2000 | Colwell et al. |
| 6,061,368 A | 5/2000 | Hitzelberger |
| 6,069,573 A | 5/2000 | Clark, II et al. |
| 6,081,440 A | 6/2000 | Washburn et al. |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

Primary Examiner—Christian P. Chace
(74) Attorney, Agent, or Firm—The Law Office of Kirk D. Williams

(57) ABSTRACT

Methods and apparatus are disclosed for implementing and using multiple virtual portions of an associative memory. An associative memory is programmed with multiple sets of entries, each of the multiple sets of entries including a different unique decoder field. A piece of information is received including a data item. A decoder field is identified. The decoder field and the data item are typically included in a lookup word used in a lookup operation in the associated memory, with the decoder field identifying which of the multiple sets of entries to search based on the data item. In one implementation, a nested condition associated with the data item is identified, and in response, multiple lookup words are generated with a predefined set of decoder fields for the data item. Multiple levels of decoder fields may be used to identify multiple subsets of entries within one of the multiple sets of entries.

10 Claims, 15 Drawing Sheets

U.S. PATENT DOCUMENTS

| | | | |
|---|---|---|---|
| 6,091,725 | A | 7/2000 | Cheriton et al. |
| 6,097,724 | A | 8/2000 | Kartalopoulos |
| 6,134,135 | A | 10/2000 | Andersson |
| 6,137,707 | A | 10/2000 | Srinivasan et al. |
| 6,141,738 | A | 10/2000 | Munter et al. |
| 6,148,364 | A | 11/2000 | Srinivasan et al. |
| 6,154,384 | A | 11/2000 | Nataraj et al. |
| 6,175,513 | B1 | 1/2001 | Khanna |
| 6,181,698 | B1 | 1/2001 | Hariguchi |
| 6,199,140 | B1 | 3/2001 | Srinivasan et al. |
| 6,236,658 | B1 | 5/2001 | Essbaum et al. |
| 6,237,061 | B1 | 5/2001 | Srinivasan et al. |
| 6,240,003 | B1 | 5/2001 | McElroy |
| 6,243,667 | B1 | 6/2001 | Kerr et al. |
| 6,246,601 | B1 | 6/2001 | Pereira |
| 6,295,576 | B1 | 9/2001 | Ogura et al. |
| 6,307,855 | B1 | 10/2001 | Hariguchi |
| 6,377,998 | B2 | 4/2002 | Noll et al. |
| 2001/0053150 | A1 * | 12/2001 | Clear et al. .............. 370/392 |

OTHER PUBLICATIONS

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

U.S. Appl. No. 09/792,625, filed Feb. 23, 2001, Necdet Uzun.

* cited by examiner 531          532
 ↓            ↓

0000        0000
0001        000X
0011        00XX
0111        0XXX
1111        XXXX

FIGURE 5C

METHOD AND APPARATUS FOR IMPLEMENTING AND USING MULTIPLE VIRTUAL PORTIONS OF PHYSICAL ASSOCIATIVE MEMORIES

FIELD OF THE INVENTION

This invention especially relates to computer and communications systems; and more particularly, the invention relates to implementing and using multiple virtual portions of one or more physical associative memories, such as, but not limited to a content-addressable memory.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches etc.) to support these new protocols and services. However, known software and firmware implementations are relatively slow, and typically place a performance bound which may be incompatible with new requirements. CAMs are increasingly being used in packet classification especially because of their performance. However, these content-addressable memories are typically expensive in terms of power consumption and space, and are limited in the size of an input word (e.g., 72, 144, etc.) on which a lookup operation is performed.

Various applications that use packet classification, such as Security Access Control, Quality of Service etc., typically need to perform many matches on source and destination port numbers, protocol and other header fields, etc.

One known approach for providing lookup capability on multiple data items is to use a separate CAM for each type of information being matched. For example, one CAM might be programmed with address information, another with quality of service information, and yet another with port information. Such an approach is expensive as it uses multiple CAMs. Needed are new methods and apparatus for implementing and using multiple virtual portions of a single associative memory, including a less costly approach for providing multiple CAM lookups on a data item.

A known approach for accommodating a lookup word having a greater length than that allowed by a single lookup word of a CAM uses a single CAM and breaks the desired lookup string into different segments and performs multiple lookups. A CAM is programmed with parent entries (i.e., those for matching a first segment) and child entries (e.g., those for matching the remaining segments), wherein each child entry includes the address of its parent as part of its lookup string to ensure that only children entries of a matched parent entry are matched. Additionally, child and parent entries contain a different two bit tag to ensure a child entry is not matched when a parent entry is desired, and vice versa. A first segment of the string is provided as input to the CAM to produce a matching address (e.g., page and word address). A lookup word including a second segment of the string along with the matching address and child tagging is then provided as input to the CAM to produce a second matching address. This process can be repeated wherein the child entry becomes the parent entry for another child entry. This approach uses a single CAM, however, the use of the address of a parent entry as the prefix for a lookup of a child entry is inflexible, and typically requires a fixed number of bits which may be excessive.

Another known approach for accommodating lookup word having a greater length than that allowed by a single lookup word of a CAM uses tags each succeeding stored entry in a long comparand with its sequence number. The first entry is tagged "1", the second entry tagged "2", the third entry is tagged "3", and so forth. After the first match is found, the second portion of the unknown is entered into the comparand register along with the tag for "2", and if a match is found, the Status register is examined to see if the match address is equal to the previous match address +1. If it is, then the third portion of the unknown can be loaded into the comparand with the tag for "3", and so forth. If the match address is not an increment from the previous address, that means the mach has failed, and the first matching location should be set to "SKIP" and a CMP V issued to find the next higher match.

SUMMARY OF THE INVENTION

Methods and apparatus are disclosed for implementing and using multiple virtual portions of one or more physical associative memories, such as, but not limited to content-addressable memories. In one embodiment, an associative memory is programmed with multiple sets of entries, each of the multiple sets of entries including a different one of multiple unique decoder fields. A piece of information is received including a data item. In one embodiment, a decoder field is identified, such as from the piece of information or from another source. The decoder field and the data item are typically included in a lookup word used to perform a lookup operation in the associated memory, with the decoder field identifying which of the multiple sets of entries to search based on the data item and/or other data. In one embodiment, a nested condition associated with the data item is identified, and in response, a predefined set of decoder fields are identified and multiple lookup words are generated based on these decoder fields and the data item and/or other data. In one embodiment, a lookup indicator is forwarded from the device generating the multiple lookup words (or other device) to a consumer of the results for understanding the context of the results generated from the associative memory lookup operations performed on the generated one or more lookup words. In one embodiment, multiple levels of decoder fields are used to identify multiple subsets of entries within one or more of the multiple sets of entries.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 5C illustrates one set of decoder values and associative memory programmed values used in one embodiment.

DETAILED DESCRIPTION

Figure 1A:
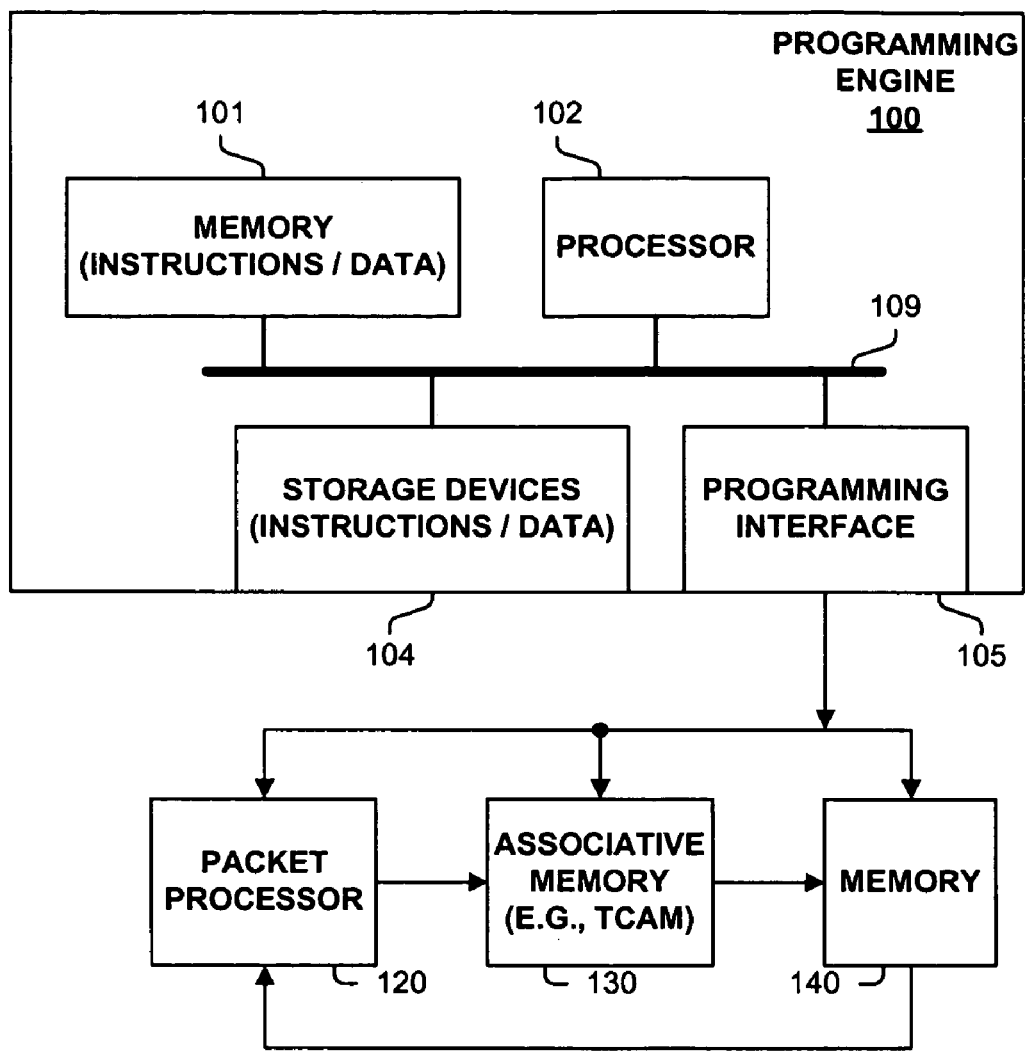
FIG. 1A is a block diagram of an embodiment for implementing and using multiple virtual portions of one or more physical associative memories.

Systems and methods are disclosed for implementing and using multiple virtual portions of one or more physical associative memories, such as, but not limited to a content-addressable memories (CAMs). Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to include a packet or any other information or data. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "associative memory" refers to all types of known or developed associative memories, including, but not limited to binary and ternary content-addressable memories, hash tables, TRIE and other data structures, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for implementing and using multiple virtual portions of one or more physical associative memories, such as, but not limited to a content-addressable memories. In one embodiment, an associative memory is programmed with multiple sets of entries, each of the multiple sets of entries including a different one of multiple unique decoder fields. A piece of information is received including a data item. In one embodiment, a decoder field is identified, such as from the piece of information or from another source. The decoder field and the data item are typically included in a lookup word used to perform a lookup operation in the associated memory, with the decoder field identifying which of the multiple sets of entries to search based on the data item and/or other data. In one embodiment, a nested condition associated with the data item is identified, and in response, a predefined set of decoder fields are identified and multiple lookup words are generated based on these decoder fields and the data item and/or other data. In one embodiment, a lookup indicator is forwarded from the device generating the multiple lookup words (or other device) to a consumer of the results for understanding the context of the results generated from the associative memory lookup operations performed on the generated multiple lookup words. In one embodiment, multiple levels of decoder fields are used to identify multiple subsets of entries within one or more of the multiple sets of entries.

One embodiment programs an associative memory with a plurality of sets of entries, each of the plurality of sets of entries associated with a different one of a plurality of unique decoder fields, and each entry within a particular one of the plurality of sets of entries including a same one of the plurality of unique decoder fields. A piece of information including a data item and a decoder value is received. A first lookup word including the data item and the decoder value is derived. A lookup operation is performed on the associative memory using the first lookup word to generate a first lookup result.

In one embodiment, a first set of the plurality of sets of entries includes a different number of entries than a second set of the plurality of sets of entries. In one embodiment, the decoder value includes a set value and a subset value. One embodiment also receives a second piece of information including a data item and a nested condition indication, identifies the nested condition, and generates a plurality of lookup words in response to said identifying, each of the plurality of lookup words including the data item and one of a plurality of predetermined decoder values.

One embodiment programs an associative memory with a plurality of sets of entries, each of the plurality of sets of entries including a different one of a plurality of unique decoder fields. A piece of information including a data item is received. A nested condition associated with the data item is identified. In response to said identifying the nested condition, a plurality of lookup words with a predefined set of decoder fields of the plurality of unique decoder fields are generated.

In one embodiment, the piece of information includes a nested condition indication. In one embodiment, the piece of information does not include a nested condition indication. In one embodiment, at least two of the plurality of sets of entries have a different number of entries. In one embodiment, each of the plurality of sets of entries has at least two entries. One embodiment forwards a lookup indication to a receiver. In one embodiment, the lookup indicator indicates the presence or absence of the nested condition. In one embodiment, the lookup indicator indicates a result context. One embodiment forwards the plurality of lookup words to an associative memory. In one embodiment, the associative memory includes a ternary or binary content-addressable memory. One embodiment performs a lookup operation on each of the plurality of lookup words to generate a plurality of lookup results. One embodiment compares a first lookup result of the plurality of lookup results with a second lookup result of the plurality of lookup results to identify whether to perform processing based on the first or second lookup result.

One embodiment performs for each particular one of a plurality of associative memory spaces: determining a size for said particular one of the plurality of associative memory spaces; allocating at least the size number of entries for said particular one of the plurality of associative memory spaces; assigning a unique decoder field to said particular one of the plurality of associative memory spaces; and adding said at least said size number of entries in the associative memory, wherein each of said at least said size number of entries includes the unique decoder field. In one embodiment, at least two of the plurality of associative memory spaces have a different number of said allocated entries.

One embodiment includes: a lookup word generator for receiving a data item and for generating a plurality of lookup words, each of the plurality of lookup words including the data item and a different one of a plurality of unique decoder fields; and an associated memory, coupled to the lookup word generator, for performing a lookup operation of each of the plurality of lookup word and to produce a plurality of associative memory results.

One embodiment includes a memory, coupled to the associative memory, to receive the plurality of associative memory results and to generate a plurality of memory lookup results. One embodiment includes a receiver to receive the plurality of memory lookup results; and wherein the lookup word generator further communicates a lookup indication to the receiver. One embodiment includes a receiver to receive the plurality of associative memory results. In one embodiment, the lookup word generator further communicates a lookup indication to the receiver. In one embodiment, the receiver compares a first associative memory result of the plurality of associative memory results with a second associative memory result of the plurality of associative memory results. In one embodiment, a result of said comparison of the first and second associative memory results determines the first associative memory result is to be processed.

One embodiment includes means for programming an associative memory with a plurality of sets of entries, each of the plurality of set of entries including a different one of a plurality of unique decoder fields; means for receiving apiece of information including a data item; means for identifying a nested condition associated with the data item; and means for generating in a plurality of lookup words with a predefined set of decoder fields of the plurality of unique decoder fields.

In one embodiment, the piece of information includes a nested condition indication. One embodiment includes means for forwarding a lookup indication to a receiver. In one embodiment, the lookup indicator indicates the presence or absence of the nested condition. One embodiment includes associative memory means for receiving the plurality of lookup words and for generating a plurality of lookup results.

FIG. 1 illustrates one embodiment of a system, which may be part of a router or other communications or computer system, for programming and using multiple virtual portions of one or more physical associative memories, such as, but not limited to a binary or ternary content-addressable memories. In one embodiment, programming engine 100 receives or determines a list of entries including a decoder field and data item and possibly a mask to program associative memory 130 and corresponding values to program memory 140. In one embodiment, programming engine 100 receives multiple sets of data items to be matched by associative memory 130, then programming engine 100 automatically adds a same decoder field to each entry in each set, with each set of entries using a different decoder field, and determines or receives corresponding values to be loaded into memory 140. In one embodiment, packet processor 120 receives or identifies one or more lists of decoder fields for which to generate a single or multiple lookup words in response to identifying a nested condition.

In one embodiment, programming engine 100 includes a processor 102, memory 101, storage devices 104, and programming interface 105, which are electrically coupled via one or more communications mechanisms 109 (shown as a bus for illustrative purposes). Various embodiments of programming engine 100 may include more or less elements. The operation of programming engine 100 is typically controlled by processor 102 using memory 101 and storage devices 104 to perform one or more tasks or processes. Memory 101 is one type of computer-readable medium, and typically comprises random access memory (RAM), read only memory (ROM), flash memory, integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise solid state storage media, disk drives, diskettes, networked services, tape drives, and other storage devices. Storage devices 104 typically store computer-executable instructions to be executed by processor 102 and/or data which is manipulated by processor 102 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 1B:
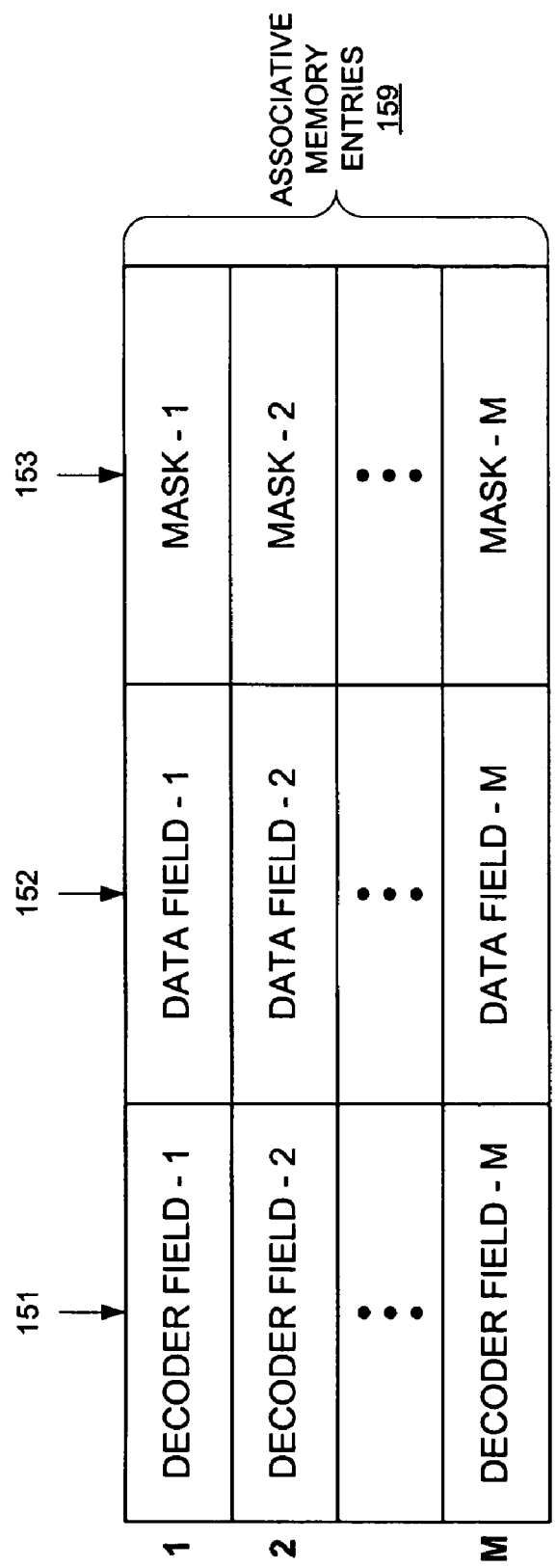
FIG. 1B is a block diagram illustrating multiple entries of an associative memory used in one embodiment.

FIG. 1B illustrates a set of entries 159 used in programming an associative memory in one embodiment. As shown, associate memory entries 159 include a decoder field 151 which can be used to identify which entries belong to which of multiple virtual associative memories, along with a data field 152 identifying a matching value within a virtual associative memory, and optionally a mask field 153 for ternary content-addressable memory type masking operations. For example, each entry belonging to a particular virtual associative memory will have a same value stored in decoder field 151, with each entry associated with different virtual associative memories having a different value. In one embodiment, entries 159 for a particular virtual associative memory are stored in consecutive locations, while in one embodiment, entries 159 for different virtual associative memories are stored in non-consecutive or random locations, or stored according to any desired methodology.

Figure 1C:
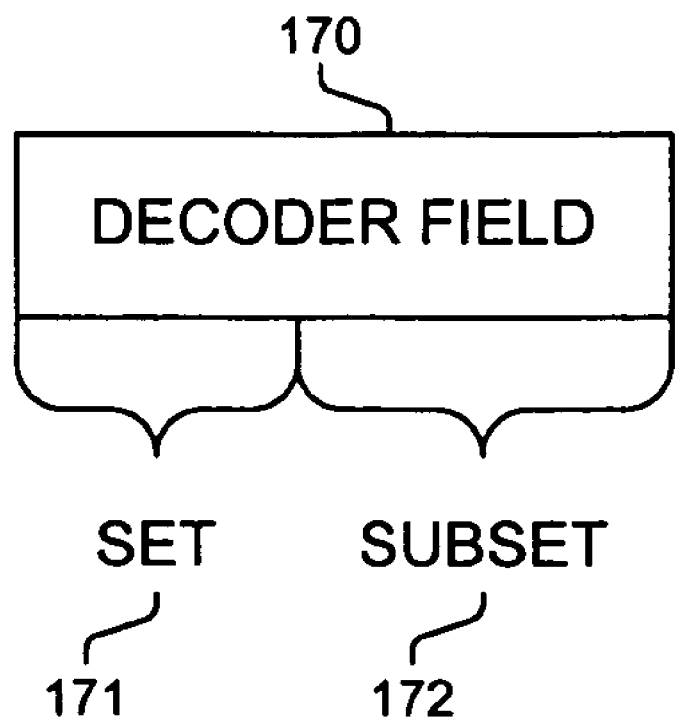
FIG. 1C is a block diagram illustrating a decoder field identifying a set and subset.

FIG. 1C illustrates how a decoder field 170, such as that used in programming an associative memory and used in performing a lookup operation of may be partitioned to identify a set of entries based on set decoder field 171 and a subset of the set of entries based on subset decoder field 172. In one embodiment, a particular set of entries can be searched with a corresponding set value specified in set decoder field 171 and wildcards programmed in subset decoder field 172. In one embodiment, a particular subset of the particular set of entries can be searched with a corresponding set value specified in set decoder field 171 and a corresponding subset value programmed in subset decoder field 172. In one embodiment, for example, a set might include a category of entries, such as, but not limited to routing information, access lists, quality of service, etc., wherein a subset identifies a specific group of entries to be searched within a particular category of entries. In addition to being able to search a particular identifiable set, and subset within a set, multiple subsets in different sets can be simultaneously searched, for example, using a wildcard to identify the particular set.

Figure 1D:
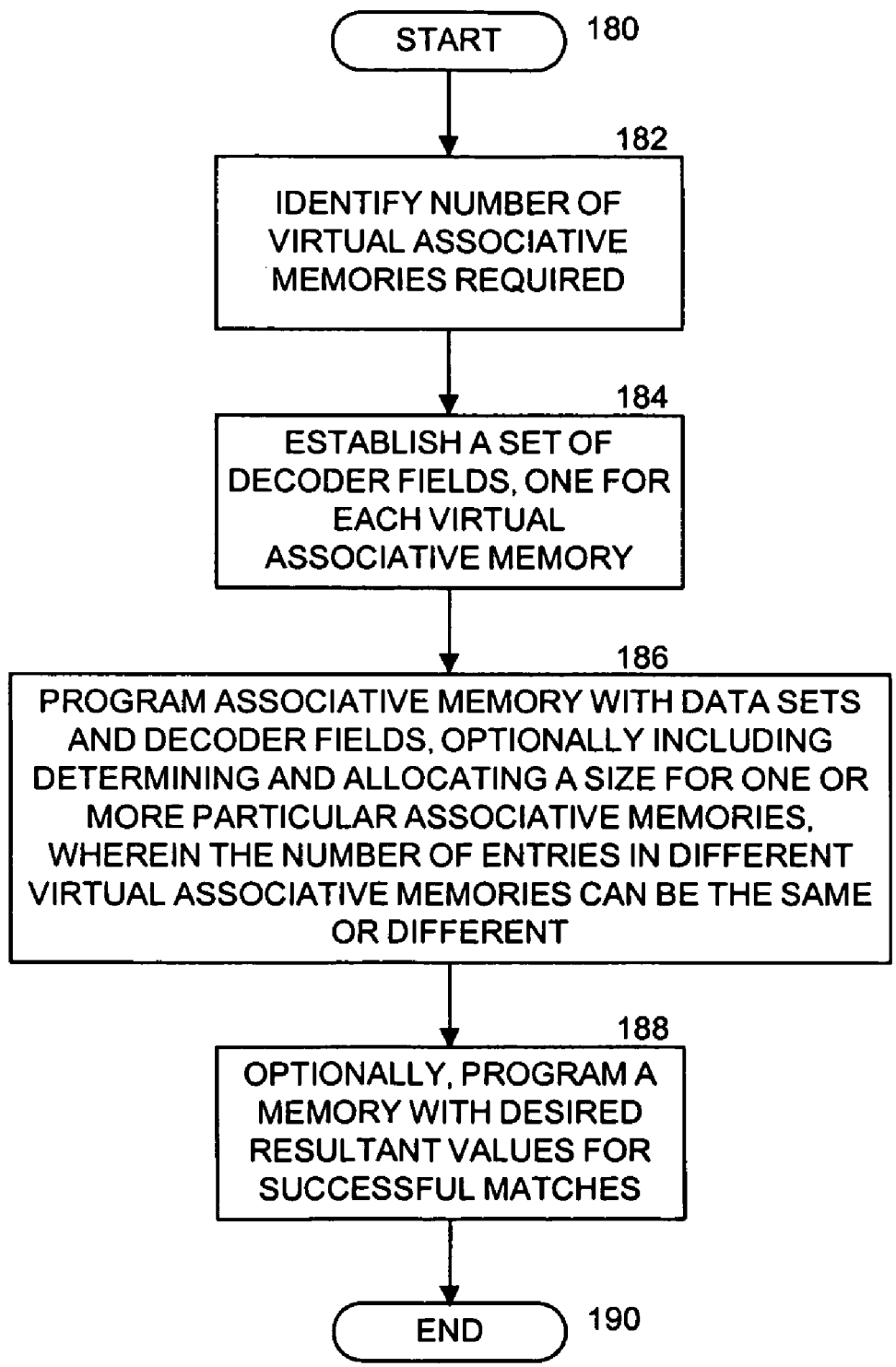
FIG. 1D is a flow diagram of a process used in one embodiment for programming an associative memory.

FIG. 1D illustrates a flow diagram of one process used in one embodiment for programming an associative memory. Processing begins with process block 180, and proceeds to process block 182, wherein the number of virtual memories (a.k.a. associative memory spaces) required is identified. Next, in process block 184, a unique set of decoder field values (which may include set and subset portions) is established for the virtual associative memories. Next, in process block 186, the associative memory is programmed with the data sets and decoder field values, wherein the number of entries each of a first and a second virtual associative memory can be the same or different. In one embodiment, a size is determined and allocated for one or more of the virtual associative memories. In process block 188, optionally, a memory is loaded with the desired resultant value for a successful match. Processing is complete as indicated by process block 190.

Figure 2A:
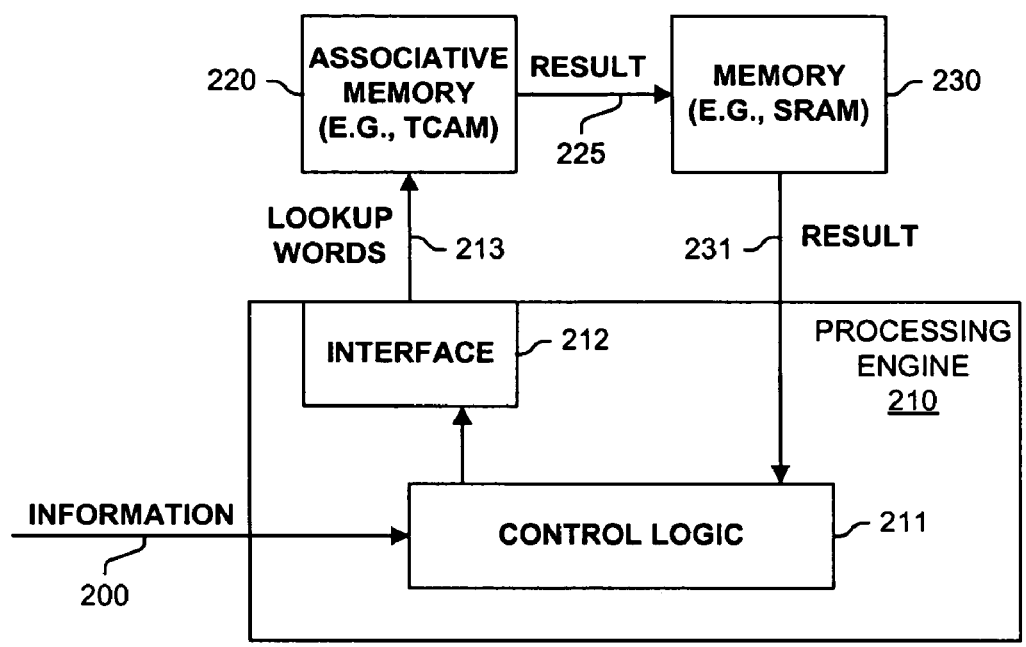
FIGS. 2A–B and 3 are block diagrams of exemplary embodiments for performing packet processing using multiple virtual portions of one or more physical associative memories.

FIG. 2A illustrates one embodiment of a system 201, which may be part of a router or other communications or computer system, for programming and using multiple virtual portions of one or more physical associative memories, such as, but not limited to a binary or ternary content-addressable memories. Information 200, such as packets or portions thereof, is received by processing engine 210. Information extracted from one or more fields or portions of each of the received information and possibly other information or constants are typically used to define lookup words 213 to provide to associative memory 220. In one embodiment, the received information includes a decoder field value to identify which virtual associative memory to use in performing a lookup operation, while in one embodiment, this decoder field value is determined by control logic 211. In one embodiment, control logic 211 identifies a nested condition associated with received information 200, and generates multiple lookup words 213, each typically with a different decoder field value, via interface 212. In one embodiment, a lookup operation is performed on lookup word 213 by associative memory 220 to produce result 225, which is used as input by memory 230 to produce one or more results 231. In one embodiment, processing engine 210 includes an application-specific integrated circuit (ASIC).

Figure 2B:
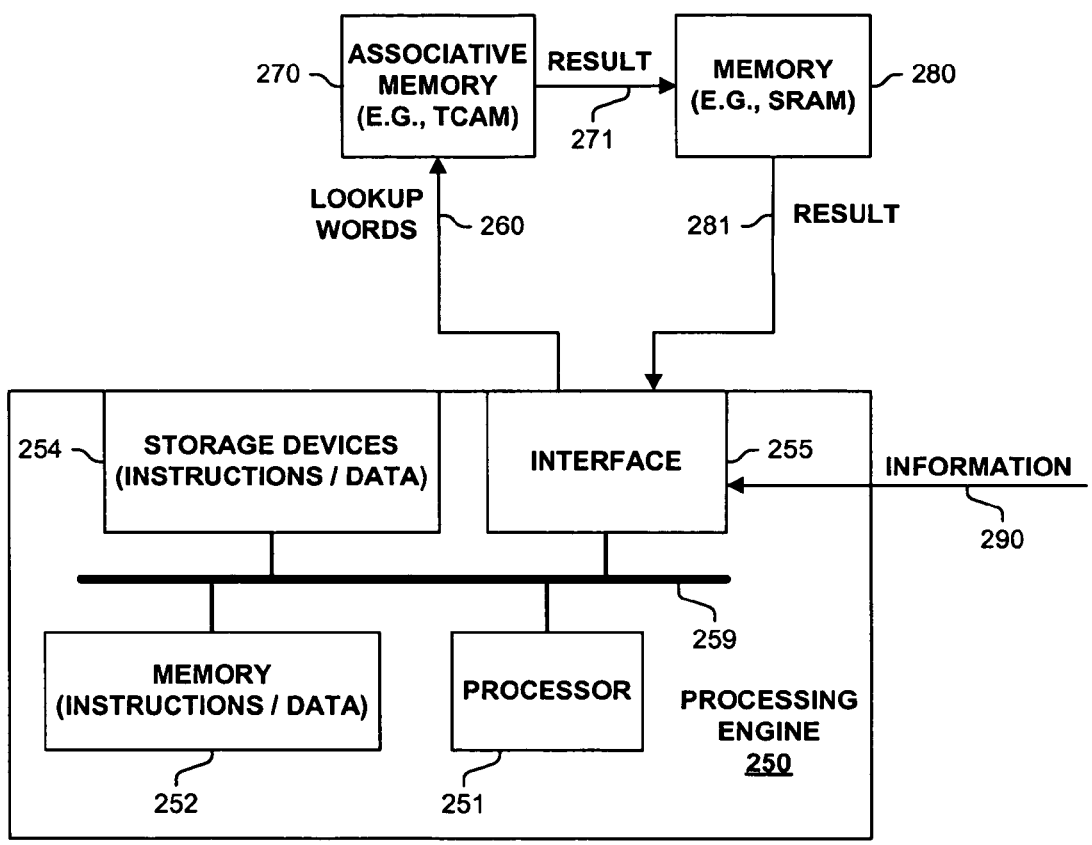

FIG. 2B illustrates one embodiment of a system 240, which may be part of a router or other communications or computer system, for programming and using multiple virtual portions of one or more physical associative memories, such as, but not limited to a binary or ternary content-addressable memories. In one embodiment, processing engine 250 includes a processor 251, memory 252, storage devices 254, and interface 255, which are electrically coupled via one or more communications mechanisms 259 (shown as a bus for illustrative purposes). Various embodiments of system 240 may include more or less elements. The operation of processing engine 250 is typically controlled by processor 251 using memory 252 and storage devices 254 to perform one or more tasks or processes.

Information 290, such as packets or portions thereof, is received by processing engine 250. Data extracted from one or more fields or portions of each of the received information and possibly other information or constants are typically used to define lookup words 260 to provide to associative memory 270. In one embodiment, the received information includes a decoder field value to identify which virtual associative memory to use in performing a lookup operation, while in one embodiment, this decoder field value is determined by processor 251. In one embodiment, processor 251 identifies a nested condition associated with received information 290, and generates multiple lookup words 260, each with a different decoder field value. In one embodiment, a lookup operation is performed on lookup word 260 by associative memory 270 to produce result 271, which is used as input by memory 280 to produce one or more results 281.

Figure 3:
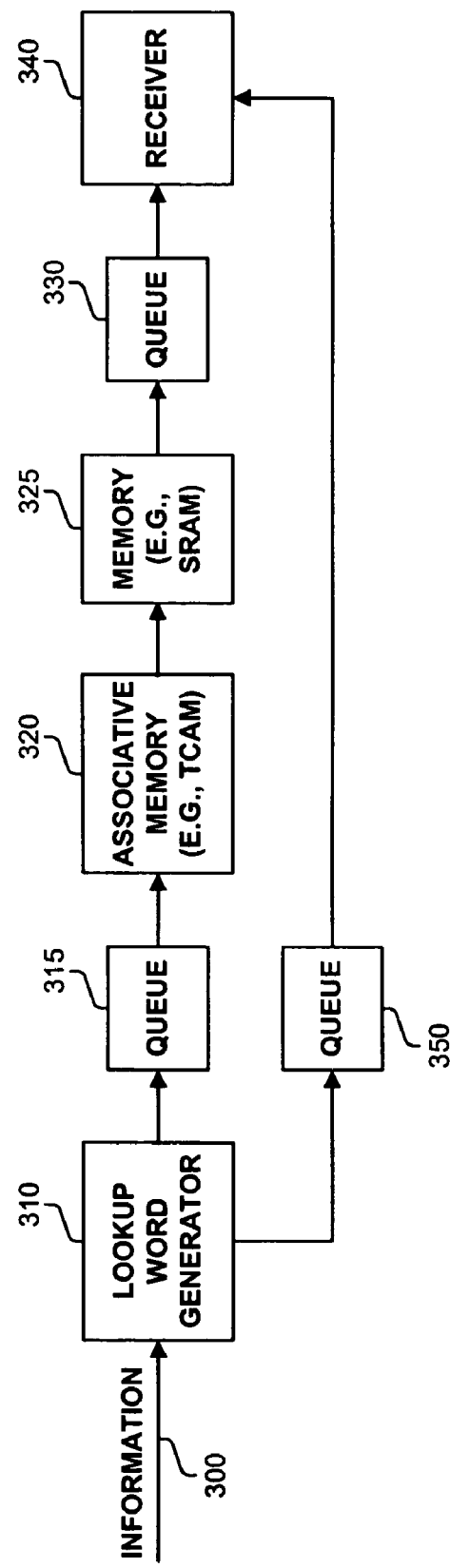

FIG. 3 illustrates one embodiment of a system 301, which may be part of a router or other communications or computer system, for programming and using multiple virtual portions of one or more physical associative memories, such as, but not limited to a binary or ternary content-addressable memories. Shown in FIG. 3 are optional queues 315, 330, and 350 for buffering data communicated between components. Embodiments may or may not include one or more of these queues 315, 330, and 350.

In one embodiment, lookup word generator 310 receives information 300, such as packets or portions thereof. Lookup word generator 310 identifies whether information 300 is related to a nested condition, such as by looking at an indicator or flag included within information 300, by referencing some data structure, by receiving an external signal, or via any other mechanism. If a nested condition is identified, multiple lookup words are produced by lookup word generator 310, with typically at least two of these lookup words targeted for matching within at least two different virtual associative memories. If a nested condition is not identified, then typically a single lookup word is typically produced based on received information 300, with an indication of which virtual associative memory to use included in information 300, by referencing some data structure, by receiving an external signal, or via any other mechanism.

Lookup word generator 310 then forwards the one or more lookup words to associative memory 320, possibly through an optional queue 315. Lookup word generator 310 also typically forwards to receiver 340 a lookup indicator or other signal to receiver 340, possibly through an optional queue 350, to identify to receiver 340 a context of results to which it will be receiving. Associative memory 320 performs lookup operations on received lookup words, with the successful matching results provided to memory 325 to perform a memory lookup operation, and to forward its resultant values to receiver 340, possibly via queue 330.

Figure 4A:
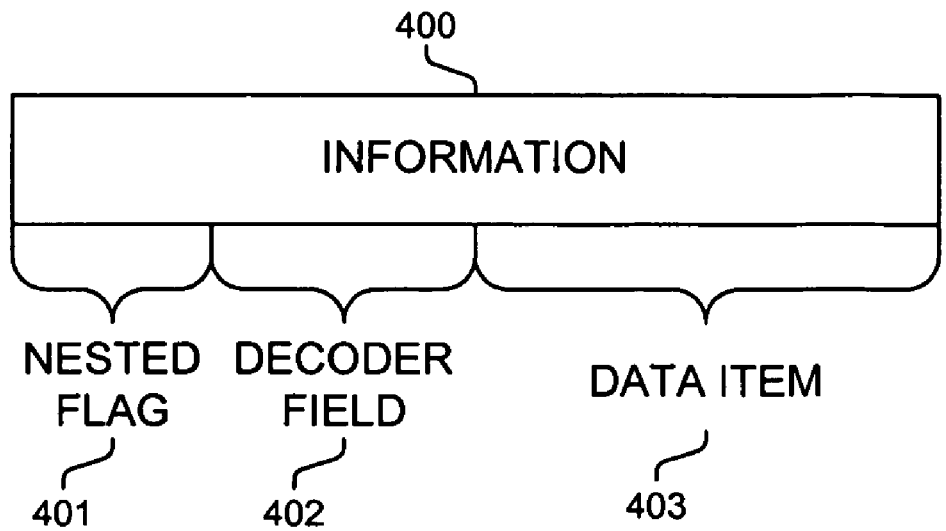
FIGS. 4A–E are block diagrams of a few of unlimited number of pieces of information, lookup words, and lookup indicators that may be used in one embodiment.
Figure 4B:
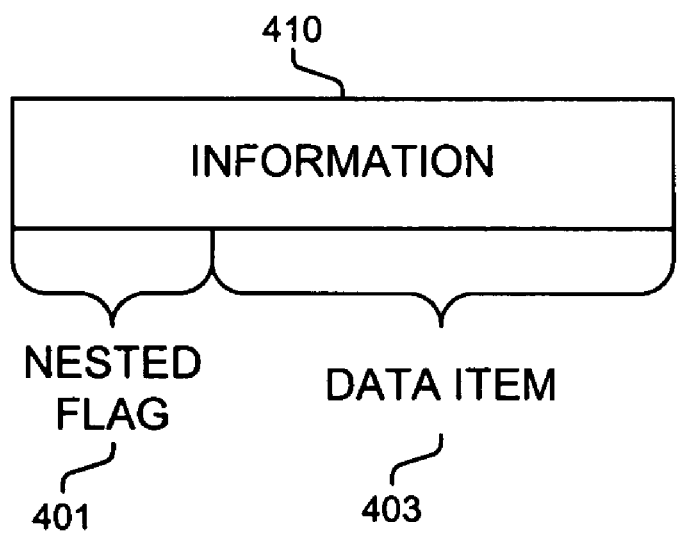
Figure 4C:
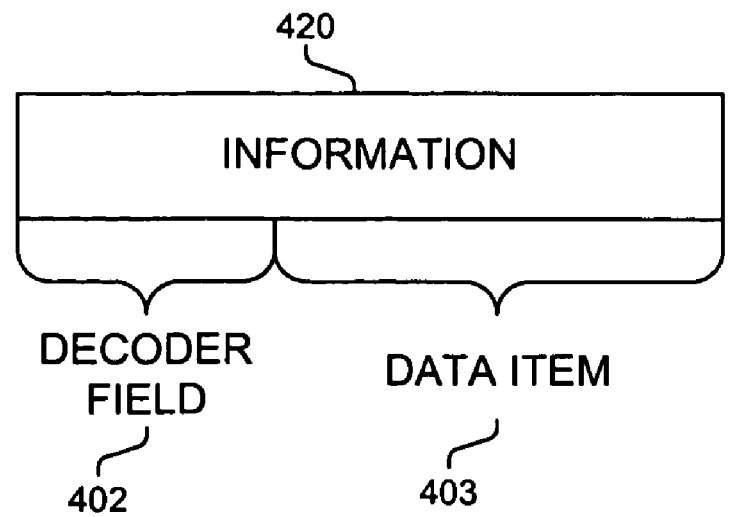
Figure 4D:
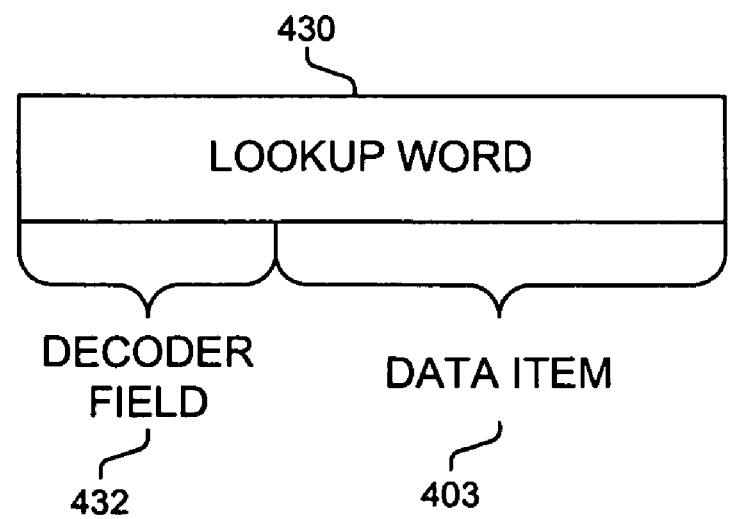

FIGS. 4A–C illustrate exemplary pieces of information 400, 410 and 420 received for processing in relation to using multiple virtual portions of an associative memory. In one embodiment shown in FIG. 4A, information 400 includes a nested flag 401, a decoder field 402, and a data item 403. In one embodiment shown in FIG. 4B, information 410 includes a nested flag 401 and a data item 403. In one embodiment shown in FIG. 4C, information 420 includes a decoder field 402 and a data item 403.

Nested flag 401 typically indicates whether or not a nested operation is to be performed. In one embodiment, if a nested operation is to be performed, a predetermined number of lookup words 430 are produced using data item 403 and a predetermined set of decoder fields typically stored in a data structure (e.g., data structure 500 illustrated in FIG. 5A) or generated via a mechanism (e.g., control logic 211 of FIG. 2A, lookup word generator 310 of FIG. 3, shift register 520 of FIG. 5B, etc.) Typically, lookup word 430 includes a decoder field 432 to identify which virtual associative memory (e.g., which set and/or subsets of associative memory entries) to search based on data item 403.

Figure 4E:
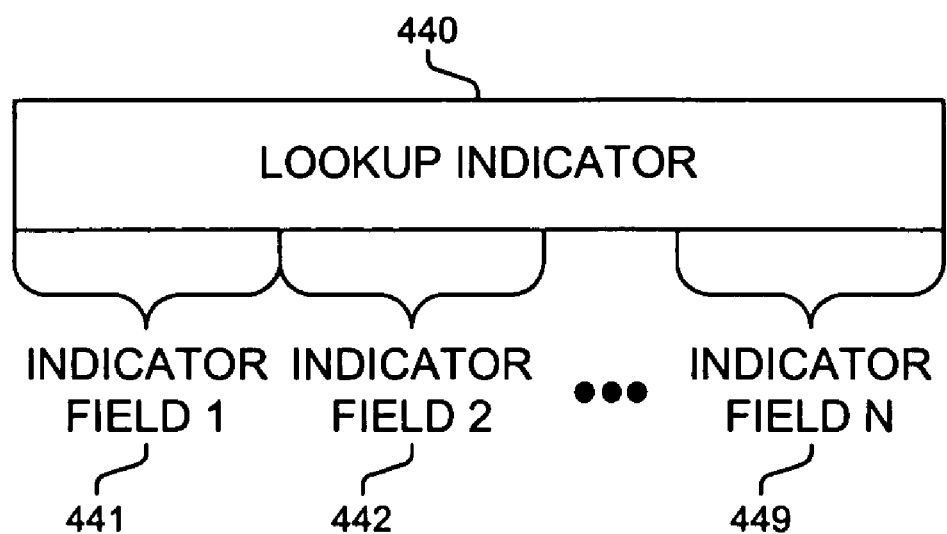

In one embodiment, a received decoder field 402 is used directly in decoder field 432 or to select a decoder field values to use. In one embodiment, if a nested condition is not indicated by nested flag 401 or no nested flag is received, then a single lookup word is typically produced including the values of decoder field 402 and data item 403. In one embodiment, a lookup indicator 440, such as that illustrated in FIG. 4E, comprised of zero or more indicator fields 441–449, is generated to indicate to a consumer of the results of the associative memory lookups generated the context of the data received. Indicator fields 441–449 may include decoder fields, or any other information or data.

Figure 5A:
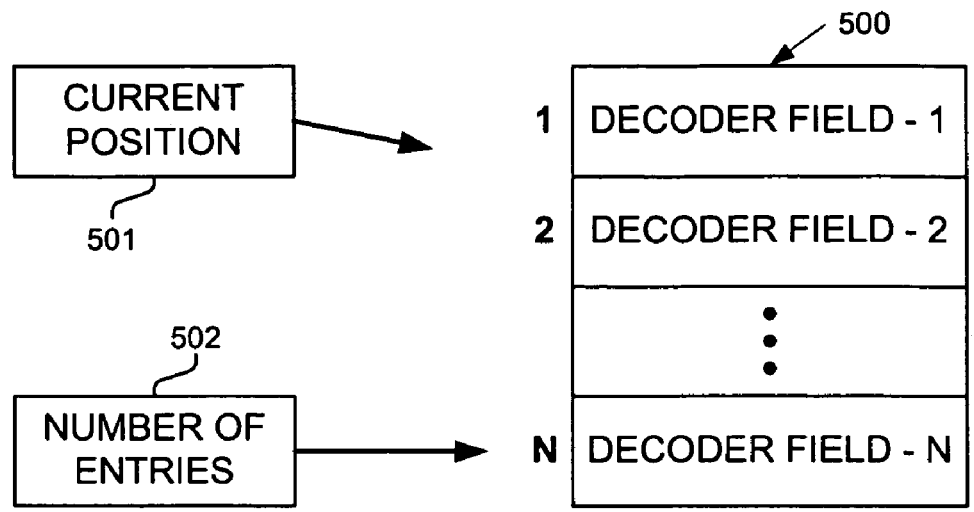
FIG. 5A is a block diagram of an exemplary data structure used for generating multiple lookup words in one embodiment.

FIG. 5A illustrates an exemplary data structure used in one embodiment for maintaining a set of predetermined decoder field values to use with a particular nested operation. As shown, an array data structure 500 includes N decoder field values, where this number N is identified in a number of entries variable 502. A current position variable 501 is used in sequencing through array data structure 500. Of course, FIG. 5A illustrates only one of an unlimited number of data structures used by embodiments of the invention.

Figure 5B:
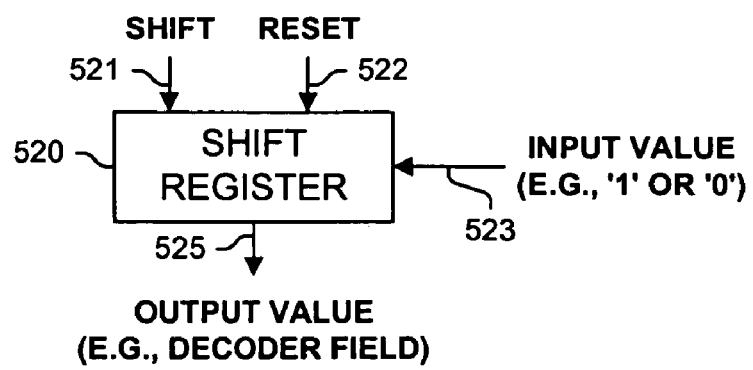
FIG. 5B is a block diagram of an exemplary shift register used for generating multiple lookup words in one embodiment.

FIG. 5B illustrates a shift register 520 used in one embodiment to generate a set of decoder fields, such as to use with a received data item identified as belonging to a nested condition. In one embodiment, shift register 520 operates in response to a shift signal 521, a reset signal 522, and an input value 523 (e.g., '1' or '0'), to produce an output value 525, such as a decoder field.

FIG. 5C illustrates a set of decoder values or fields 531 and programmed associative memory values or fields 532 used in one embodiment. Decoder values 531 are stored in data structure 500 (FIG. 5A) in one embodiment and generated by shift register 520 (FIG. 5B) in one embodiment.

In one embodiment, decoder values 531 include four bits to for use in generating five lookup words. A sequence of decoder values 531 can be generated by any mechanism, such as by shift register 520 (FIG. 5B) by resetting shift register 520 and shifting in an input value 523 of '1' to produce the sequence of: '0000', '0001', '0011', '0111', '1111'. A corresponding associative memory can be programmed into several virtual portions with the decoder fields being: '0000', '000x', '00xx', '0xxx', 'xxxx', where x identifies a wildcard.

In one embodiment, when performing multiple lookups using decoder values 531 in this order, the first lookup can match any entry in the associative memory, the second lookup can match any entry not in the first portion (a.k.a. partition, group, set, subset, etc.) If the first lookup did not match an entry in the first portion, the second lookup will match the same entry as the first lookup even if the match was not in the second portion. The third lookup will match any entry but entries in the first and second groups. If the first and/or second lookups didn't match the second portion, the third lookup will match same entry as the second lookup, and possibly also that of the first lookup, and so on.

In this example and in one embodiment, the processing device receives all of these five results based on the lookup words generated using decoder values 531, and compares the first result to the second result. If they are different, it knows the result is from the first portion, and processes this result according to its context. Otherwise, the results are the same and the first result is skipped. Then, the processing device compares the second and third results. If they are different, it knows the result is from the second portion, and processes this result according to its context. Otherwise, the results are the same and the second result is skipped. This process repeats for all of the generated lookup results for a particular nested condition.

In one embodiment, any action defined in one of the result may have additional information that this is the last action to be taken in this nested operation. So, if this result is processed according to the above conditions, all following results are flushed and ignored.

Figure 6A:
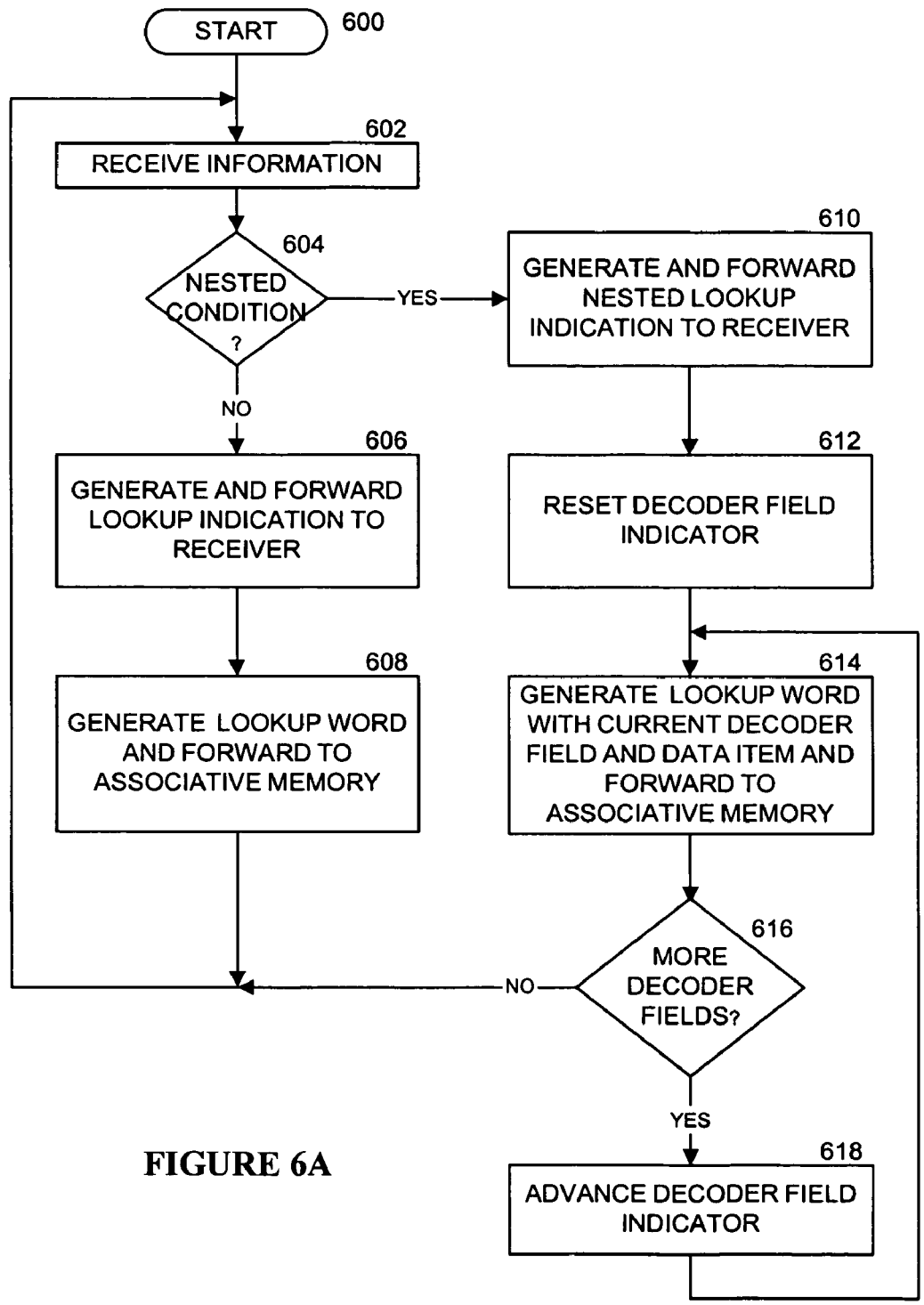
FIGS. 6A–C are flow diagrams of processes, one or more of which are used in one embodiment for generating multiple lookup words and/or for processing the results of corresponding multiple lookup operations.

FIG. 6A presents a flow diagram of a process for used for generating multiple lookup words using multiple decoder fields and a single data item in one embodiment. Processing begins with process block 600, and proceeds to process block 602, wherein a piece of information is received. Next, as determined in process block 604, if a nested condition is not identified, then a lookup indicator identifying a non-nested context is generated and forwarded to the receiver in process block 606, and in process block 608, a lookup word is generated and presented to the associative memory. Otherwise, a nested condition was identified in process block 604, and in process block 610, a lookup indicator identifying a nested context is generated and forwarded to the receiver. In process block 612, the decoder field indicator used to sequence through a list of predetermined decoder field values is reset. While all desired decoder field values have not been used in generating a lookup word for the received information as performed by process blocks 614, 616, and 618, a lookup word is generated including the decoder field value indicated by the decoder field indicator and a data item included in the received information, and the decoder field indicator is advanced to a next decoder field value. When all lookup words have been generated for the received information, processing returns to process block 602 to receive and process more information.

Figure 6B:
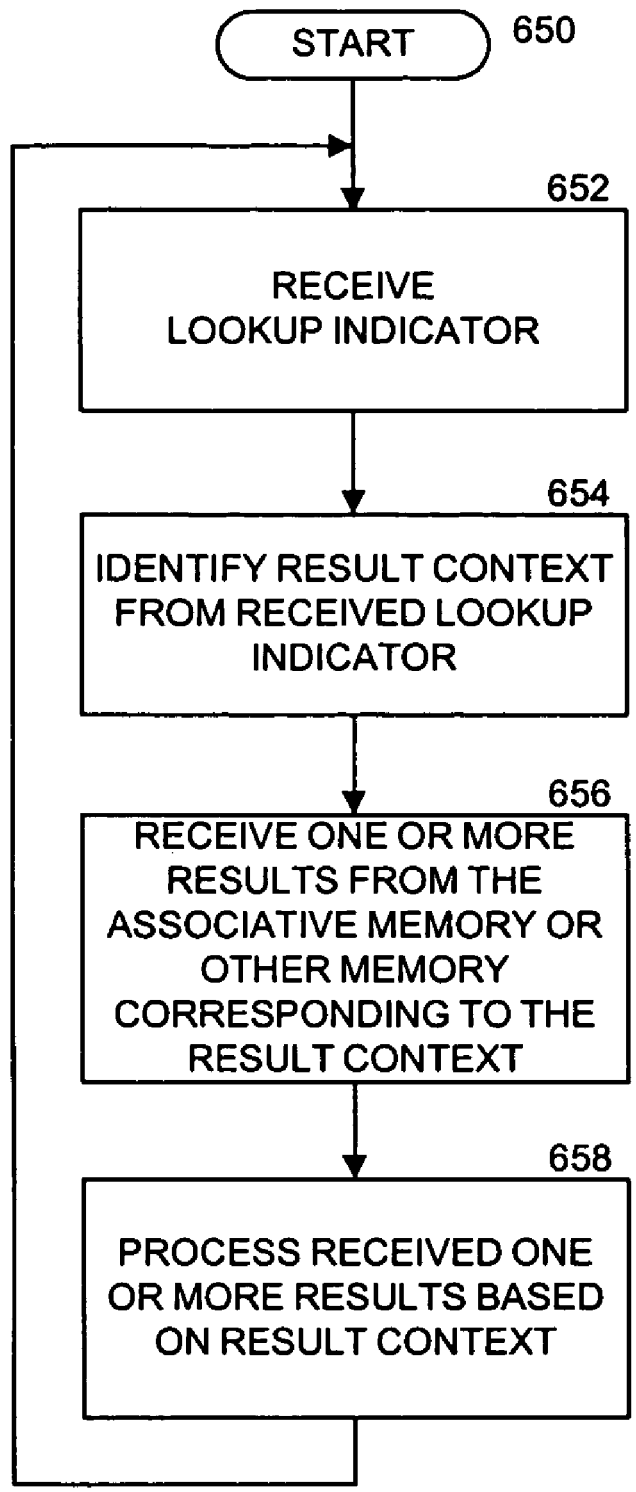

FIG. 6B presents a flow diagram of a process used for identifying and using results generated by multiple lookup words using multiple decoder fields and a single data item in one embodiment. Processing begins with process block 650, and proceeds to process block 652, wherein a lookup indication is received. Next, in process block 654, a result context is identified from the received lookup indication. In process block 656, one or more results are received via the associative memory and/or optional memory lookup operation, and in process block 658, these results are processed according to the identified results context. Processing returns to process block 654 to receive and process more results.

Figure 6C:
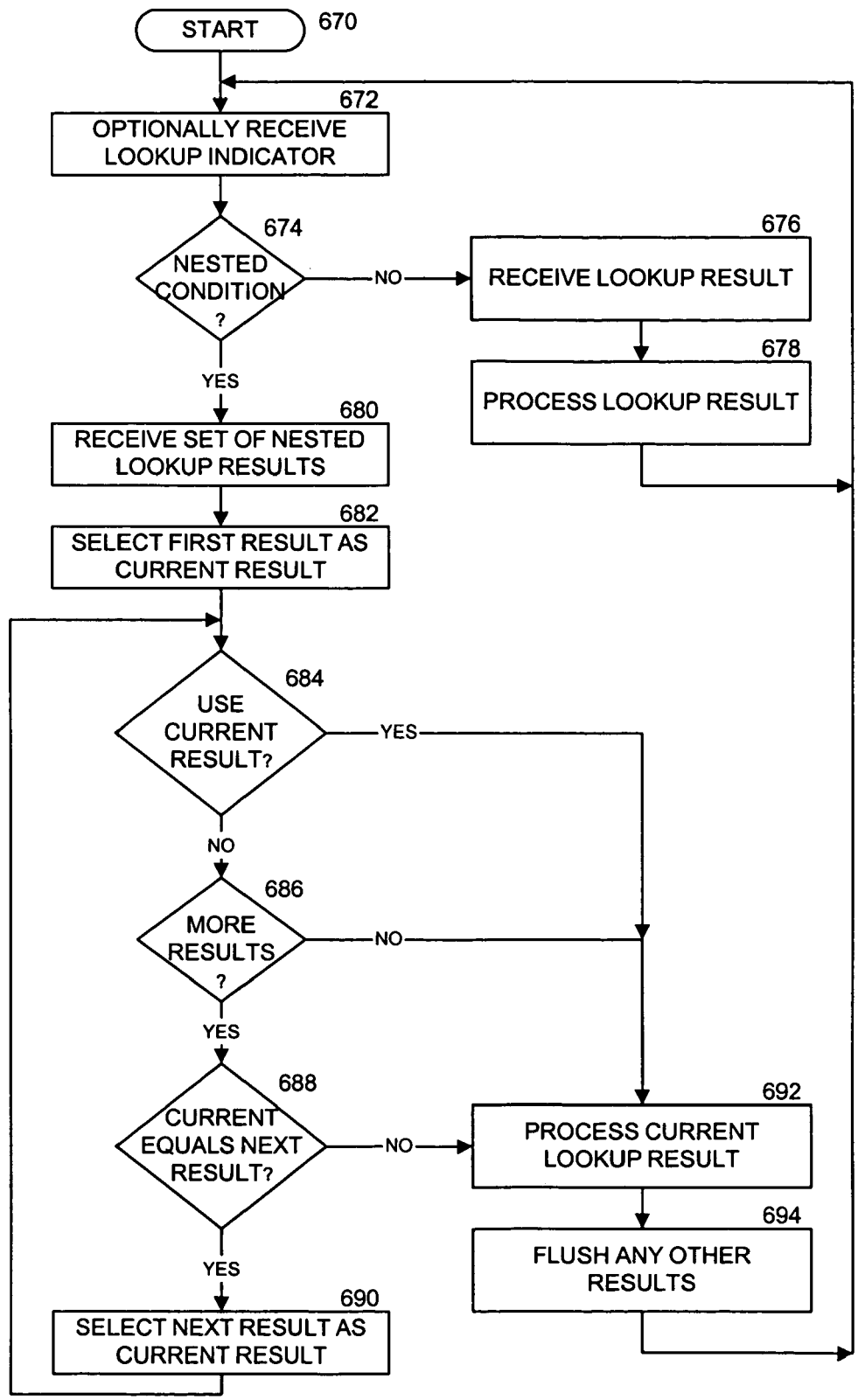

FIG. 6C illustrates a process used in one embodiment for identifying and using results generated by multiple lookup words using multiple decoder fields and a single data item in one embodiment. Processing begins with process block 670, and proceeds to process block 672, wherein optionally, a receive lookup indicator (e.g., a value, signal, or other indication) is received to identify a context of the results. Next, as determined in process block 674, if a nested condition is not identified, then in process blocks 676–678, the lookup result is received and processed, with processing returning to process block 672.

Otherwise, a nest condition is identified, and in process block 680, the corresponding nested lookup results are received. In process block 682, a first result is selected as the current result. If, as determined in process block 684, the result is not identified as being the one to use, then processing continues to process block 686. If there are more results, then if the current result equals the next result as determined in process block 688, the current result is set to the next result in process block 690, and processing returns to process block 684.

Otherwise, the current result is processed in process block 692, any remaining results corresponding to the nested condition being processed are flushed in process block 694, and processing returns to process block 672.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus comprising:
   means for programming an associative memory with a plurality of sets of entries, each of the plurality of sets of entries including a different one of a plurality of unique decoder fields;
   means for acquiring a piece of information including a data item and a nested flag indication signifying whether or not a nested operation is to be performed using the data item included in said piece of information; and
   means for performing the nested operation using the data item extracted from said piece of information in response to the nested flag indication signifying to perform the nested operation, the nested operation including producing a predetermined sequence of a plurality of lookup words with a predetermined sequence of decoder fields of the plurality of unique decoder fields, wherein each of said produced plurality of lookup words includes the data item extracted from said piece of information and a respective particular decoder field of the predetermined sequence of decoder fields; and
   means for performing a lookup operation in the associative memory using each of said produced plurality of lookup words to produce a plurality of lookup results corresponding to the data item with each of the predetermined sequence of decoder fields.

2. The apparatus of claim 1, further comprising means for forwarding the plurality of lookup results and a lookup indication to another device or component, wherein the lookup indication signifies whether or not said nested operation was performed for said piece of information or the data item.

3. The apparatus of claim 1, wherein the associative memory is a content-addressable memory.

4. The apparatus of claim 1, wherein said producing the predetermined sequence of the plurality of lookup words with the predetermined sequence of decoder fields includes using a shift register to generate the predetermined sequence of decoder fields.

5. The apparatus of claim 1, including means for performing a single lookup operation with a lookup word including the data item extracted from said piece of information in response to the nested flag indication signifying not to perform the nested operation instead of performing said nested operation for the data item.

6. A method for performing lookup operations, the method comprising:
- programming an associative memory with a plurality of sets of entries, each of the plurality of sets of entries including a different one of a plurality of unique decoder fields;
- acquiring a data item and a nested flag indication signifying whether or not a nested operation is to be performed using the data item;
- performing the nested operation using the data item in response to the nested flag indication signifying to perform the nested operation, the nested operation including producing a predetermined sequence of a plurality of lookup words with a predetermined sequence of decoder fields of the plurality of unique decoder fields, wherein each of said produced plurality of lookup words includes the data item and a respective particular decoder field of the predetermined sequence of decoder fields; and
- performing a lookup operation in the associative memory using each of said produced plurality of lookup words to produce a plurality of lookup results corresponding to the data item with each of the predetermined sequence of decoder fields.

7. The method of claim 6, wherein the associative memory is a content-addressable memory.

8. The method of claim 6, wherein said producing the predetermined sequence of the plurality of lookup words with the predetermined sequence of decoder fields includes using a shift register to generate the predetermined sequence of decoder fields.

9. One or more computer-readable storage media tangibly embodying computer-executable instructions for performing operations using an associative memory programmed with a plurality of sets of entries, each of the plurality of sets of entries including a different one of a plurality of unique decoder fields based on an acquired piece of information including a data item and a nested flag indication signifying whether or not a nested operation is to be performed using the data item included in said piece of information, said operations comprising:
- testing the nested flag indication to identify whether or not the nested flag indication signifies to perform the nested operation; and
- performing the nested operation using the data item in response to the nested flag indication signifying to perform the nested operation, the nested operation including producing a predetermined sequence of a plurality of lookup words with a predetermined sequence of decoder fields of the plurality of unique decoder fields, wherein each of said produced plurality of lookup words includes the data item and a respective particular decoder field of the predetermined sequence of decoder fields;
- wherein the associative memory is configured to perform a lookup operation using each of said produced plurality of lookup words to produce a plurality of lookup results corresponding to the data item with each of the predetermined sequence of decoder fields.

10. The method of claim 9, wherein the associative memory is a content-addressable memory.

* * * * *

UNITED STATES PATENT AND TRADEMARK OFFICE
CERTIFICATE OF CORRECTION

PATENT NO. : 6,961,808 B1
DATED : November 1, 2005
INVENTOR(S) : Oren et al.

It is certified that error appears in the above-identified patent and that said Letters Patent is hereby corrected as shown below:

Column 6,
Line 58, replace "apiece" with -- a piece --.

Signed and Sealed this

Third Day of January, 2006

JON W. DUDAS
*Director of the United States Patent and Trademark Office*